United States Patent [19]

Marion

[11] 4,247,277

[45] Jan. 27, 1981

[54] CUP BEAD OR FILL LINE FORMER

[75] Inventor: Thomas E. Marion, Baltimore, Md.

[73] Assignee: Maryland Cup Corporation, Owings Mills, Md.

[21] Appl. No.: 6,879

[22] Filed: Jan. 25, 1979

[51] Int. Cl.³ .............................................. B29C 1/12
[52] U.S. Cl. .................................. 425/393; 264/313; 425/403
[58] Field of Search ............... 425/393, 396, 400, 403; 269/48.1; 264/313

[56] References Cited

U.S. PATENT DOCUMENTS

| 3,570,065 | 3/1971 | Guerrero | 425/393 |
| 3,823,216 | 7/1974 | Petzetakis | 425/393 X |
| 3,923,952 | 12/1975 | LaBranche | 425/393 X |

Primary Examiner—Thomas P. Pavelko
Attorney, Agent, or Firm—Birch, Stewart, Kolasch & Birch

[57] ABSTRACT

An improved apparatus is provided for forming the bead or fill line or groove in paper cups or containers by axially compressing an annulus of a resilient material thereby causing a controlled deformation of the material outwardly about its periphery. This outward deformation occurs internally of a cup pot or die which includes an internal bead, fill line or groove defining cavity into which a portion of a sidewall of a paper cup or container confined within the die will be forced by the said deformation to form the bead, fill line or groove.

4 Claims, 4 Drawing Figures

CUP BEAD OR FILL LINE FORMER

FIELD OF THE INVENTION

This invention relates to bead or fill line forming devices for paper cups and containers and more particularly to resilient compressible means acting in conjunction with a die or a holding pot to form such beads or fill lines in the sidewalls of containers held in a said die or holding pot.

BACKGROUND OF THE INVENTION

In the prior art, the bead or fill lines in paper cups and/or containers were formed by utilizing a spinning forming disc, the disc spinning into a position near the top of the sidewall of the paper cup or container thereby creating a bead, groove or fill line in the sidewall of the cup or container. A cam follower in a machined cam track, and cam drive shaft in a relatively complex beader assembly were required to achieve the desired result. An auxiliary loader for the spinning disc was also required.

This prior art assemby required a substantial number of moving parts thereby making such units relatively expensive to build and maintain. Therefore, there is a present need in the art to simplify the structure and operation of container, bead or fill line forming assemblies.

Accordingly, an object of the present invention is to provide a simplified contaier, bead or fill line forming assembly.

It is another object of the present invention to provide a new and novel deformable member for imparting a bead or fill line to the sidewall of a container in cooperation with a container die.

These and other objects of the invention will become more fully apparent with reference to the following specification and drawings which relate to a preferred embodiment of the present invention.

SUMMARY OF THE INVENTION

The present invention comprises a reciprocating beader assembly which includes a dependent drive rod on which is mounted a bead or fill line forming assembly, the latter comprising an axially compressible resilient annulus, an anvil axially supporting said annulus, and a die-engaging stop ring fixedly joined to the anvil. A floating pressure ring opposed to the anvil and juxtaposed with said annulus is interconnected with the drive rod to lift the stop ring and hence, the annulus, in one direction of reciprocation and to lower the stop ring and the annulus in the opposite direction of reciprocation. The stop ring engages the upper surface of the die or holding pot to terminate downward reciprocation of the anvil and thus provide a reaction surface against which the pressure ring can axially compress the resilient annulus in response to continued downward reciprocation of the drive rod.

The pressure ring is mounted to the drive rod by tubular spacers extending through the stop ring from a thrust collar threaded onto the drive rod, and further, supports the stop ring which controls the depth of penetration of the deformable annulus and anvil into the die or holding pot.

At a desired depth of penetration, determined by the stop ring, the pressure ring continues to advance the ensuing axial compression against the anvil causes a radial deformation in the nature of an outward peripheral expansion of the resilient annulus toward the inner wall of the die or holding pot.

An internal annular groove is defined in the internal wall surface of the die or holding pot. The depth of the groove defines the desired depth of penetration of the resilient annulus.

Thus, a container having its sidewall juxtaposed with the internal wall surface of the die or holding pot will have that sidewall engaged and upset into the said internal annular groove of the die by the radial deformation of the resilient annulus to form the desired bead, groove or fill line therein.

BRIEF DESCRIPTION OF THE DRAWINGS

The present invention will become more fully understood from the detailed description given hereinbelow and the accompanying drawings which are given by way of illustration only; and thus, are not limitative of the present invention, and wherein.

DETAILED DESCRIPTION OF THE DRAWINGS

Figure 1:
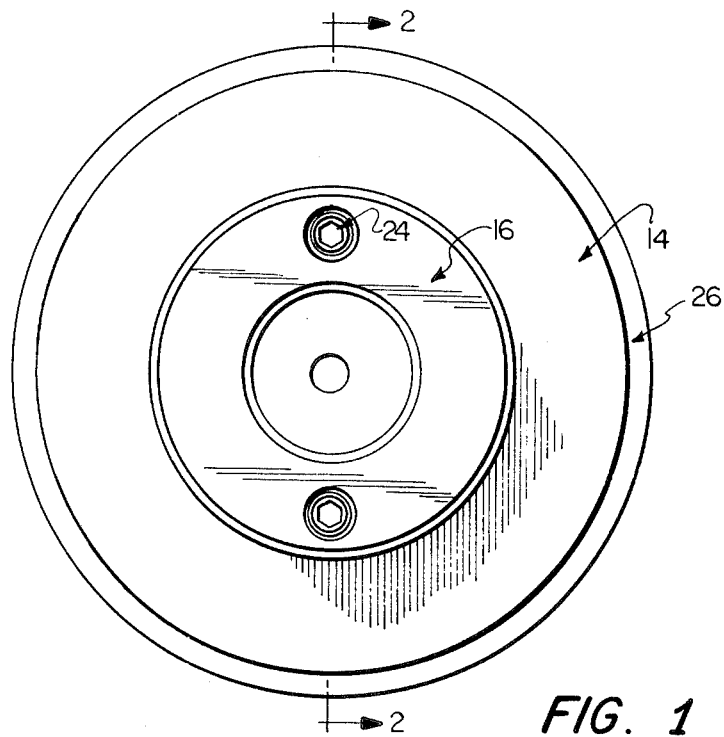
FIG. 1 is a top-plan view of the fill line forming assembly with the drive rod removed.
Figure 2:
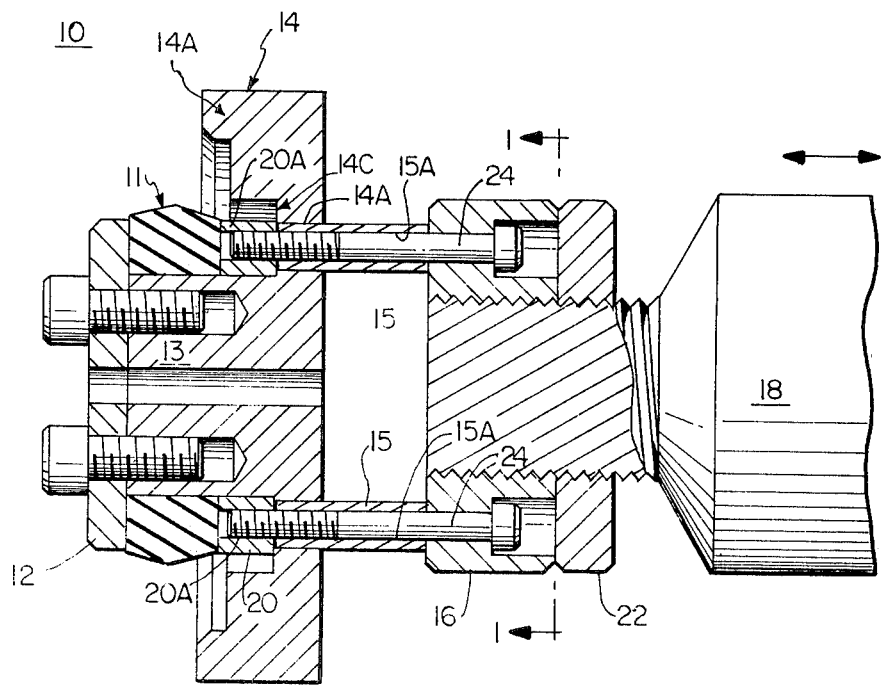
FIG. 2 is a cross-section taken along line 2—2 of FIG. 1.

Referring in detail to the drawings and with particular reference to FIGS. 1 and 2, the fill line forming assembly 10 of the present invention is shown as including a resilient annulus 11 seated on an anvil 12, both surrounding a dependent axial shaft or stub portion 13 of a stop ring assembly 14.

A pair of parallel tubular spacers 15 extend downwardly from a position in which the uppermost end of each is in abutment with the lowermost surface of a thrust collar 16, the latter being threaded onto the lowermost tip of a drive rod 18, the spacers 15 extending through a corresponding pair of bores 14A in the upper surface of the stop ring 14, to a position of abutment with the upper surface of a pressure ring 20. The lowermost surface of the pressure ring 20 is in juxtaposition with the uppermost surface of the resilient annulus 11.

The thrust collar 16 is maintained in a desired position with respect to the tip of the drive rod 18 by means of a locking nut or collar 22 threadably engaged with the drive rod 18 and threadably adjusted into locking juxtaposition with the uppermost surface of the thrust collar 16.

The pressure ring 20 includes a pair of threaded bores 20A extending downwardly therethrough in respectively coaxial registry with the internal bores 15A of the tubular spacers 15. The assembly of the stop ring 14, pressure ring 20, tubular spacers 15 and the thrust collar 16 are all rendered integral by a pair of bolts 24 having threaded tips inserted into the threaded bores 20A in the pressure ring 20 to thereby clamp the pressure ring 20 and the thrust collar 16 securely against opposite ends of the tubular spacers 15.

The tubular spacers 15 are mounted for sliding movement within the bores 14A of the stop ring 14 to permit relative movement between the presssure ring 20, the resilient annulus 11, and the anvil 12 and stop ring 14.

The stop ring 14 has an annular die engaging lip 14B and a relieved annular portion 14C constituting a top curl accomodating portion to be hereinafter more fully described in conjunction with FIGS. 3 and 4.

Figure 3:
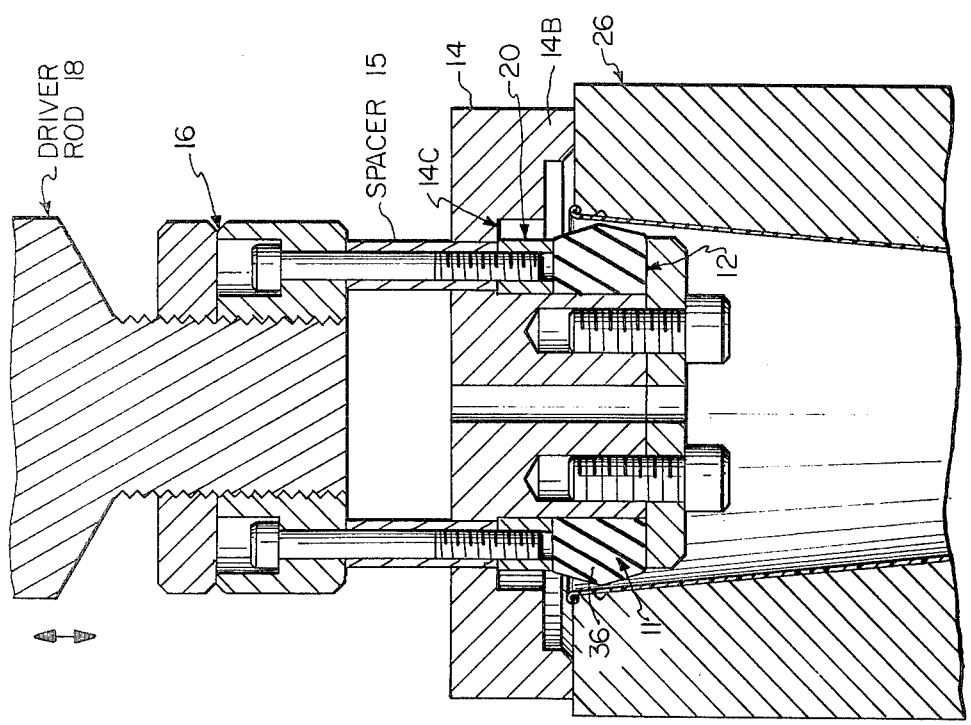
FIG. 3 is a cross-section taken along line 2—2 of FIG. 1 including the drive rod and the cup pot or die means and the stop ring coming into contact with the die means prior to compression of the resilient annulus.

Referring to FIG. 3, the drive rod 18 moves in a reciprocating fashion, moving in an upward and downard direction. When the drive rod 18 moves in the downward portion of its reciprocating stroke, this movement is transmitted to the attached thrust collar 16, the spacers 15 and the pressure ring 20.

The stop ring 14, and in particular, the relieved annular portion 14C of the stop ring 14, rests in abutment with the upper surface of the pressure ring 20 so that the pressure ring 20 provides the necessary support for the stop ring 14 when the drive rod 18 proceeds in the downward portion of its reciprocating stroke.

When the annular die engaging lip portion 14B of the stop ring 14 comes into contact with the die 26, the upper surface of the pressure ring 20 and the lower surface of the relieved annular portion 14C of the stop ring 14 separate. As the drive rod 18 continues in the downward portion of its reciprocation stroke, surface pressure develops between the lowermost surface of the pressure ring 20 and the uppermost surface of the resilient annulus 11. Since the resilient annulus 11 is resting firmly against the upper surface of the anvil 12, the resilient annulus experiences compressive forces on its upper and lower annular surfaces, namely, a downward force from the pressure ring 20 and an upward force from the upper lateral surface of anvil 12.

Figure 4:
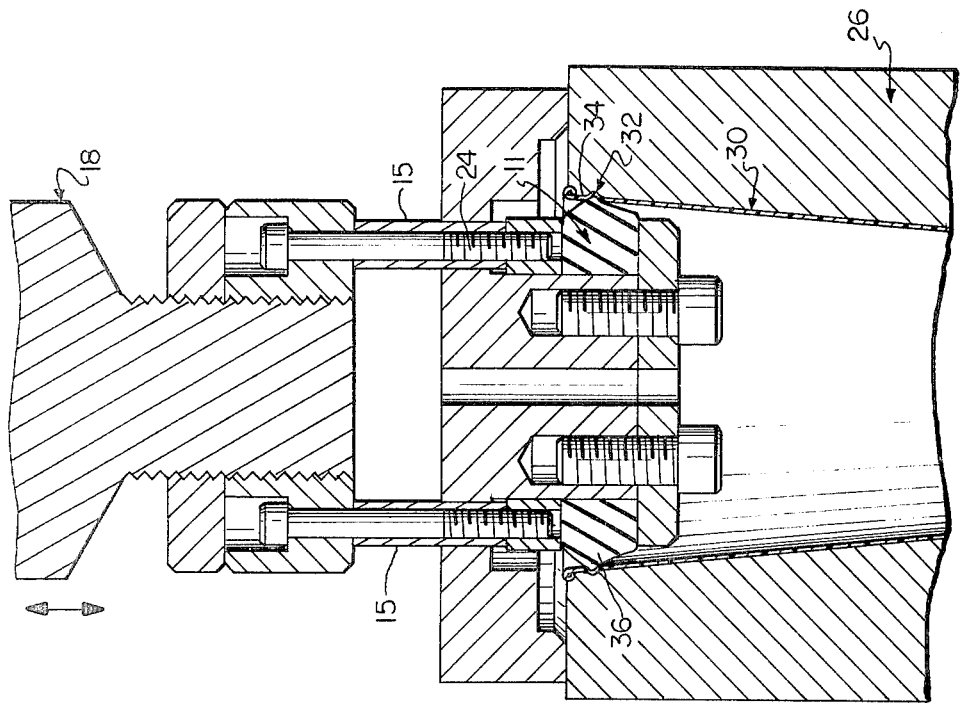
FIG. 4 is a similar view to FIG. 3 with the resilient annulus shown in its expanded operative state in engagement with the sidewall of a cup contained in the cup pot or die means.

Referring to FIG. 4, the compressive forces being exerted against the upper and lower surface of the annulus 11 causes an outward peripheral expansion of a peripheral apex 36 of the said annulus toward the inner wall 30 of the die 26. The annulus 11 is conformally shaped with the groove 32 or other forming surface in the die 26.

An internal annular groove 32 is defined in the inner wall surface 30 of the die 26. The groove 32 has a predetermined depth. A container 34 is seated within the die 26 with its sidewall juxtaposed with the inner wall surface 30 of the die 26.

As the resilient annulus 11 expands outwardly along its peripheral apex 36, it upsets that portion of the sidewall of the container 34 which is adjacent to the internal annular groove 32. Continued peripheral expansion of the resilient annulus 11 causes the sidewall portion of the container 35 adjacent the groove 32 to assume the shape and the depth of the internal annular groove 32.

When the drive rod 18 commences the upward portion of its reciprocating stroke, the compressive forces on the resilient annulus 11 are released thereby causing an inward peripheral contraction of the peripheral apex 36 of the resilient annulus 11. The peripheral apex 36 of the annulus 11 contracts from within the groove 32 leaving the upset sidewall portion of container 34 in the groove 32 thereby permanently forming an annular fill line in the cup or container.

The finished container is ejected from the cup pot or die and the operation of the present invention is repeated for additional containers.

This apparatus eliminates a substantail number of moving parts relative to prior art fill line forming assemblies thereby greatly simplifying the structure and operation of fill line forming assemblies.

It should be understood that the present invention may be modified as would occur to one of ordinary skill in the art without departing from the spirit and scope of the appended claims.

We claim:

1. Means for forming an annular fill line groove internally of the sidewall of a paper container, comprising:
    die means for receiving a container to be grooved, said die means having an annular bead or fill line defining groove formed in an internal surface thereof; and
    header assembly means positioned above said die means for selectively engaging a container sidewall placed in said die means and deforming same into said defining groove, comprising:
    an annular resilient mass selectively positioned adjacent said defining groove; and
    compressing means axially compressing said resilient mass and deforming said mass radially into juxtaposition with said defining groove thereby upsetting a said container sidewall placed therebetween into said defining groove to form a said annular bead or fill line groove in said container sidewall, said compressing means including anvil means extending beneath and axially supporting said annular resilient means, said anvil means including a stop means selectively engageable and disengageable with said die means to index said resilient mass adjacent said defining groove.

2. The invention defined in claim 1, wherein said compressing means further comprises;
    a pressure ring axially compressing said resilient mass in opposition to said anvil to radially deform said resilient mass.

3. The invention defined in claim 1, wherein said header assembly further includes:
    reciprocating drive means presenting and removing said header assembly means to and from said die means; and
    reciprocating actuating means driven by said drive means and constraining said compressing means to alternatively compress and release said resilient mass.

4. The invention defined in claim 3, wherein said compressing means further comprises:
    anvil means extending beneath and axially supporting said annular resilient means and including a stop means engageable with said die means to index said resilient mass adjacent said defining groove; and
    a pressure ring axially compressing said resilient mass in opposition to said anvil to radially deform said resilient mass;
    said pressure ring being engaged with and driven by said reciprocating actuating means.

* * * * *